(12) United States Patent
Ikeda et al.

(10) Patent No.: US 6,181,576 B1
(45) Date of Patent: Jan. 30, 2001

(54) POWER SUPPLY APPARATUS FOR ARC-UTILIZING APPARATUSES

(75) Inventors: Tetsuro Ikeda, Osaka; Kenzo Danjo, Soraku-gun; Takamitsu Imahori, Yamatokoriyama, all of (JP)

(73) Assignee: Sansha Electric Manufacturing Company Limited, Osaka (JP)

( * ) Notice: Under 35 U.S.C. 154(b), the term of this patent shall be extended for 0 days.

(21) Appl. No.: 09/545,422

(22) Filed: Apr. 7, 2000

(30) Foreign Application Priority Data

Apr. 9, 1999 (JP) .................................................. 11-102612

(51) Int. Cl.[7] .......................... H02M 3/335; H02M 7/44; H02M 5/42
(52) U.S. Cl. .................................. 363/17; 363/25; 363/98
(58) Field of Search .................................. 363/17, 24, 25, 363/55, 58, 95, 98, 131, 132, 134

(56) References Cited

U.S. PATENT DOCUMENTS

| | | | |
|---|---|---|---|
| 4,897,522 | * | 1/1990 | Bilczo et al. ........................... 363/26 |
| 5,272,313 | * | 12/1993 | Karino et al. .......................... 363/142 |
| 5,751,568 | * | 5/1998 | Danjo et al. ............................ 363/95 |
| 5,877,952 | * | 3/1999 | Moriguchi et al. .................... 363/101 |
| 5,926,381 | * | 7/1999 | Moriguchi et al. .................... 363/171 |
| 5,930,122 | * | 7/1999 | Moriguchi et al. .................... 363/171 |
| 5,942,139 | * | 8/1999 | Moriguchi et al. .................. 219/130.33 |
| 6,111,216 | * | 8/2000 | Stava .................................. 219/130.51 |

* cited by examiner

Primary Examiner—Peter S. Wong
Assistant Examiner—Bao Q. Vu
(74) Attorney, Agent, or Firm—William H. Murray

(57) ABSTRACT

A rectifier 4 develops a rectified voltage between output terminals thereof. Capacitors 6a and 6b are connected in series between the output terminals of the rectifier. Inverters 8a and 8b convert DC voltages across the associated ones of the capacitors 6a and 6b into high-frequency voltages, which are, then, voltage transformed. The transformed voltages are rectified by diodes 24a and 24b for application to an arc-utilizing apparatus. Inverter control circuits 38a and 38b control the inverters 8a and 8b, respectively, in such a manner as to make current-representative signals from current detectors 50a and 50b equal to a reference signal, respectively. A voltage divider 54 is connected in parallel with the series combination of the capacitors 6a and 6b. Voltage detectors 62a and 62b connected between the junction A of the capacitors 6a and 6b and the junction B of resistors of the voltage-divider 54 develop a voltage representative signal representative of the voltage between the junctions A and B. The reference signal is applied to an attenuator 70a, 68a, 66a having an attenuation factor variable in response to the voltage representative signal so that the reference signal associated with one control circuit has a different value from the reference signal for the other control circuits.

10 Claims, 4 Drawing Sheets

US 6,181,576 B1

POWER SUPPLY APPARATUS FOR ARC-UTILIZING APPARATUSES

This invention relates to a power supply apparatus for use with arc-utilizing apparatuses, such as an arc welder, a plasma arc welder, an arc cutter and a plasma arc cutter, which utilize an arc to process articles.

BACKGROUND OF THE INVENTION

Some such power supply apparatuses include an input-side AC-to-DC converter which converts a commercial AC voltage into a DC voltage. The DC voltage is then converted into a high-frequency voltage in an inverter, and the high-frequency voltage is voltage-transformed by a transformer. The voltage-transformed voltage is then converted back into a DC voltage in an output-side high-frequency-to-DC converter. The resulting DC voltage is applied to an arc-utilizing apparatus. The transformer can be small in size because voltage-transforming is carried out after a DC voltage is converted into a high-frequency voltage. This, in turn, enables down-sizing of the power supply apparatus.

When, for example, an input voltage is of the order of four hundred volts (400 V), a voltage as high as at least 400 V×$\sqrt{2}$≅565V may be applied to the inverter. Then, IGBTs or MOSFETs used in the inverter as its switching devices must have withstand voltage of 1200 V or higher. Fewer switching devices having a withstand voltage of 1200 V or higher are commercially available relative to switching devices having a withstand voltage of 600 V or so. In addition, one switching device having a withstanding voltage of the order of 1200 V is more expensive than two switching devices having a withstanding voltage of 600 V. The switching frequency at which a switching device having a withstand voltage of the order of 600 V can be switched can be higher than the switching frequency for a 1200 V withstand voltage switching device. Accordingly, a transformer succeeding such inverter formed of 600 V withstand voltage switching devices can be smaller, which, in turn, makes it possible to manufacture a smaller sized power supply apparatus.

In U.S. Pat. No. 5,272,313 issued on Dec. 21, 1993 and assigned to the same assignee as the present application, a power supply apparatus which is small in size and can be manufactured at a low cost has been proposed. The power supply apparatus disclosed in this U.S. patent can receive a high input voltage by virtue of using a series combination of two inverters formed by switching devices having a withstand voltage of the order of 600 V.

The power supply apparatus of the U.S. patent is schematically shown in FIG. 1. A three-phase commercial AC voltage of the order of, for example, 400 V is applied to input power supply terminals 2a, 2b and 2c. The input AC voltage is, then, rectified by an input-side rectifier 4 in the form of, for example, a diode-bridge configuration. Instead of the three-phase AC voltage, a single-phase AC voltage may be applied to the input power supply terminals.

The input-side rectifier 4 has two output terminals, namely, a positive output terminal P and a negative output terminal N, between which a pair of smoothing capacitors 6a and 6b are connected in series to smooth the rectifier output voltage into a DC voltage.

An inverter 8a is connected across the capacitor 6a, and an inverter 8b is connected across the capacitor 6b. The inverters 6a and 6b form a DC-to-high-frequency converter. The inverters 8a and 8b include semiconductor switching devices, e.g. IGBTs 10a and 12a, and IGBTs 10b and 12b, respectively. The IGBTs 10a, 10b, 12a and 12b have a withstand voltage of the order of, for example, 600 V. The collector-emitter paths of the IGBTs 10a and 12a of the inverter 8a are connected in series, and a series combination of capacitors 14a and 16a is connected in parallel with the series combination of the IGBTs 10a and 12a. Flywheel diodes 18a and 20a are connected in parallel with the collector-emitter paths of the IGBTs 10a and 12a, respectively, with their anodes connected to the emitters of the respective IGBTs and with their cathodes connected to the collectors.

The inverter 8b also includes capacitors 14b and 16b and flywheel diodes 18b and 20b, which are connected in the same manner as the capacitors 14a and 16a and the flywheel diodes 18a and 20a of the inverter 8a. The inverters 8a and 8b convert a DC voltage inputted thereto to a high-frequency voltage.

A primary winding 22aP of a high-frequency transformer 22a has its two ends connected to the junction of the IGBTs 10a and 12a, which provides an output terminal of the inverter 8a, and the junction of the capacitors 14a and 16a. Also, a primary winding 22bP of a high-frequency transformer 22b has its two ends connected to the junction of the IGBTs 10b and 12b, which provides an output terminal of the inverter 8b, and the junction of the capacitors 14b and 16b. The transformers 22a and 22b form the rest of the DC-to-high-frequency converter.

The anodes of output-side rectifying diodes 24a and 26a are connected to opposite ends of a secondary winding 22aS1 of the transformer 22a, and the anodes of output-side rectifying diodes 24b and 26b are connected to opposed ends of a secondary winding 22bS1 of the transformer 22b. The cathodes of the four rectifying diodes 24a, 24b, 26a and 26b are connected together to a positive load output terminal 30P through a smoothing reactor 28. Intermediate taps on the secondary windings 22aS1 and 22bS1 are connected together to a negative load output terminal 30N. An arc-utilizing apparatus is connected between the output terminals 30P and 30N. With this arrangement, high-frequency voltages induced across the secondary windings 22aS1 and 22bS1 are converted to a DC voltage, which, in turn, is applied to the arc-utilizing apparatus.

A load current detector 32 is connected between the junction of the intermediate taps of the secondary windings and the negative load output terminal 30N, to detect a load current and produce a load-current representative signal representing the load current. The load-current representative signal is applied to an error amplifier 34, to which also applied is a load-current setting signal from an output-current setting device 36. The output-current setting device 36 is used to set the level of the output current supplied to the load. The error amplifier 34 develops an error signal representing the difference between the load-current representative signal and the load-current setting signal, which is applied to inverter control units 38a and 38b. The inverter control unit 38a provides a control signal to the IGBTs 10a and 12a for controlling the conduction period of the IGBTs 10a and 12a, while the inverter control unit 38b provides a control signal to the IGBTs 10b and 12b for controlling the conduction period of the IGBTs 10b and 12b. These connections provide a feedback control to automatically make the load current equal to the load current as represented by the load-current setting signal.

The transformers 22a and 22b have another secondary windings 22aS2 and 22bS2, respectively. A diode bridge formed by diodes 40a, 42a, 44a and 46a has its input terminals connected to the two ends of the secondary winding 22aS2, has its one output terminal connected through a resistor 48a to one end of the smoothing capacitor 6b and has its other output terminal connected to the other end of the capacitor 6b. Similarly, a diode bridge formed by diodes 40b, 42b, 44b and 46b has its input terminals connected to the two ends of the secondary winding 22bS2, has its one output terminal connected through a resistor 48b to one end of the smoothing capacitor 6a and has its other output terminal connected to the other end of the capacitor 6a.

Input voltages to the inverters 8a and 8b would sometimes differ due to difference in capacitance and leak current of the capacitors 6a and 6b. However, with the above-described arrangement, the input voltages can be balanced. For example, when the input voltage to the inverter 8a is higher than the input voltage to the inverter 8b, the voltage applied across the primary winding 22aP of the transformer 22a is higher than the voltage across the primary winding 22bP of the transformer 22b, resulting in a higher voltage induced across the secondary winding 22aS2 than across the secondary winding 22bS2. The higher induced voltage is applied across the smoothing capacitor 6b which has provided the lower output voltage, while the lower induced voltage is applied across the smoothing capacitor 6a which has provided the higher output voltage. As a result, the input voltages to the inverters 8a and 8b are balanced with respect to each other. The same can be said when the input voltage applied to the inverter 8a is lower than the input voltage to the inverter 8b.

If it is desired to correct imbalance of the input voltages to the inverters 8a and 8b at a high rate, low resistance resistors must be used as the resistors 48a and 48b. Also, the resistors 48a and 48b have to conduct a large current like the one flowing in the inputs of the inverters 8a and 8b. Such low resistance, large current conducting resistors should be large in size, which cancels out the downsizing realized by the use of the inverters 8a and 8b.

Therefore, an object of the present invention is to provide a power supply apparatus which can rapidly correct imbalance in voltage and can still be small in size.

SUMMARY OF THE INVENTION

A power supply apparatus according to the present invention includes an input-side rectifier for rectifying an AC signal and developing a rectified signal between two, positive and negative output terminals. A pair of smoothing capacitors are connected in series between the negative and positive output terminals of the input-side rectifier. A pair of DC-to-high-frequency converters convert DC signals supplied thereto from the associated ones of the smoothing capacitors into high-frequency signals. Each of the DC-to-high-frequency converters includes a semiconductor switching device. Each DC-to-high-frequency converter may further include a transformer. A high-frequency-to-DC converter converts high-frequency signals supplied thereto from the DC-to-high-frequency converters into a DC signal and applies it to an arc-utilizing apparatus. Signal detecting means detects a DC signal supplied from the high-frequency-to-DC converter to the arc-utilizing apparatus, and provides a detected-signal representative signal representing the value of the detected DC signal. As the signal detecting means may detect output current or voltage supplied to the arc-utilizing apparatus. Alternatively, it may detect current flowing through the DC-to-high-frequency converter.

Control means are associated with the respective ones of the DC-to-high-frequency converters. Each control means controls the conduction period of the switching device of the associated DC-to-high-frequency converter in such a manner as to make the detected-signal representative signal applied thereto equal to a reference signal applied thereto. A voltage divider circuit is connected in parallel with the series combination of the smoothing capacitors. The voltage divider circuit includes a pair of voltage-diving resistors connected in series. Voltage detecting means is connected between the junction of the of smoothing capacitors and the junction of the voltage-dividing resistors, to detect the voltage between the two junctions. The voltage detecting means detects the voltage between the two junctions and develops a voltage representative signal representing the voltage it detects. The reference signal is applied to correction means. The correction means is responsive to the voltage representative signal applied thereto by changing the value of the reference signal as applied to one of the control means to have a different value from the reference signal as applied to the other of the control means so that the detected-voltage representative signal becomes zero. Alternatively, the detected-signal representative signal may be applied to the correction means, and the correction means changes the detected-signal representative signal as applied to one of the control means to have a different value from the detected-signal representative signal as applied to the other control means so that the voltage representative signal becomes zero.

Each of the DC-to-high-frequency converters may be connected across the associated voltage-dividing resistor. In this case, the correction means changes the reference signal (or the detected-signal representative signal) so as to decrease the DC signal applied to the DC-to-high-frequency converter which is connected via its associated voltage-dividing resistor to that capacitor across which a higher voltage is developed.

In this case, the voltage detecting means may be of non-contact type, which provides a first control signal when the voltage at the junction of the voltage-dividing resistors is higher than the voltage at the junction of the smoothing capacitors, and provides a second control signal when the voltage at the junction of the voltage-dividing resistors is lower than the voltage at the junction of the smoothing capacitors. The correction means either decreases the reference signal or increases the detected-signal representative signal as applied to the control means for the DC-to-high-frequency converter connected to that capacitor which is connected to the positive output terminal of the input-side rectifier, when the first control signal is provided. On the other hand, when the second control signal is provided from the voltage detecting means, the correction means either decreases the reference signal or increases the detected-signal representative signal as applied to the control means for the DC-to-high-frequency converter connected to that capacitor which is connected to the negative output terminal of the input-side rectifier.

Each of the DC-to-high-frequency converters may have its input connected across the associated smoothing capacitor. The correction means changes either of the reference signals or detected-signal representative signals in such a sense as to increase the DC signal applied to the DC-to-high-frequency converter connected to the capacitor the voltage across which is higher than the voltage across the other, relative to the DC signal applied to the other DC-to-high-frequency converter.

In this case, the voltage detecting means may be of a non-contact type which provides a first control signal when the voltage at the junction of the voltage-dividing resistors is higher than the voltage at the junction of the smoothing capacitors, and provides a second control signal when the voltage at the junction of the voltage-dividing resistors is lower than the voltage at the junction of the smoothing capacitors. The correction means either decreases the reference signal or increases the detected-signal representative signal as applied to the control means for the DC-to-high-frequency converter connected to that capacitor which is connected to the negative output terminal of the input-side rectifier, when the first control signal is provided. On the other hand, when the second control signal is provided from the voltage detecting means, the correction means either decreases the reference signal or increases the detected-signal representative signal as applied to the control means for the DC-to-high-frequency converter connected to that capacitor which is connected to the positive output terminal of the input-side rectifier.

The signal detecting means may detect signals conducted through the respective ones of the DC-to-high-frequency converters. The semiconductor switching devices of the respective DC-to-high-frequency converters are controlled in accordance with the respective detected signals flowing through themselves. Therefore highly precise control can be made.

DETAILED DESCRIPTION OF EMBODIMENTS

Figure 1:
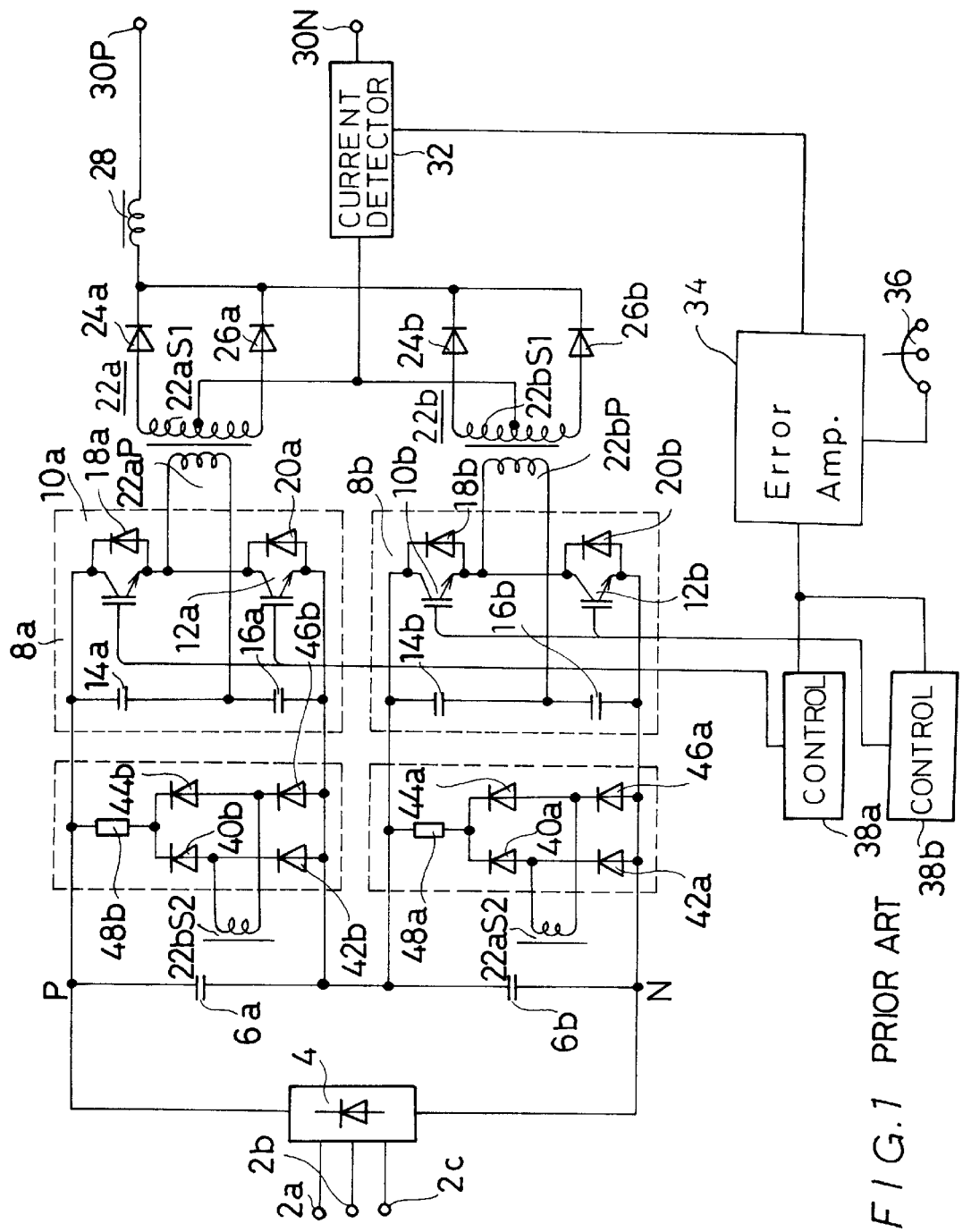
FIG. 1 is a block circuit diagram of a prior art power supply apparatus.
Figure 2:
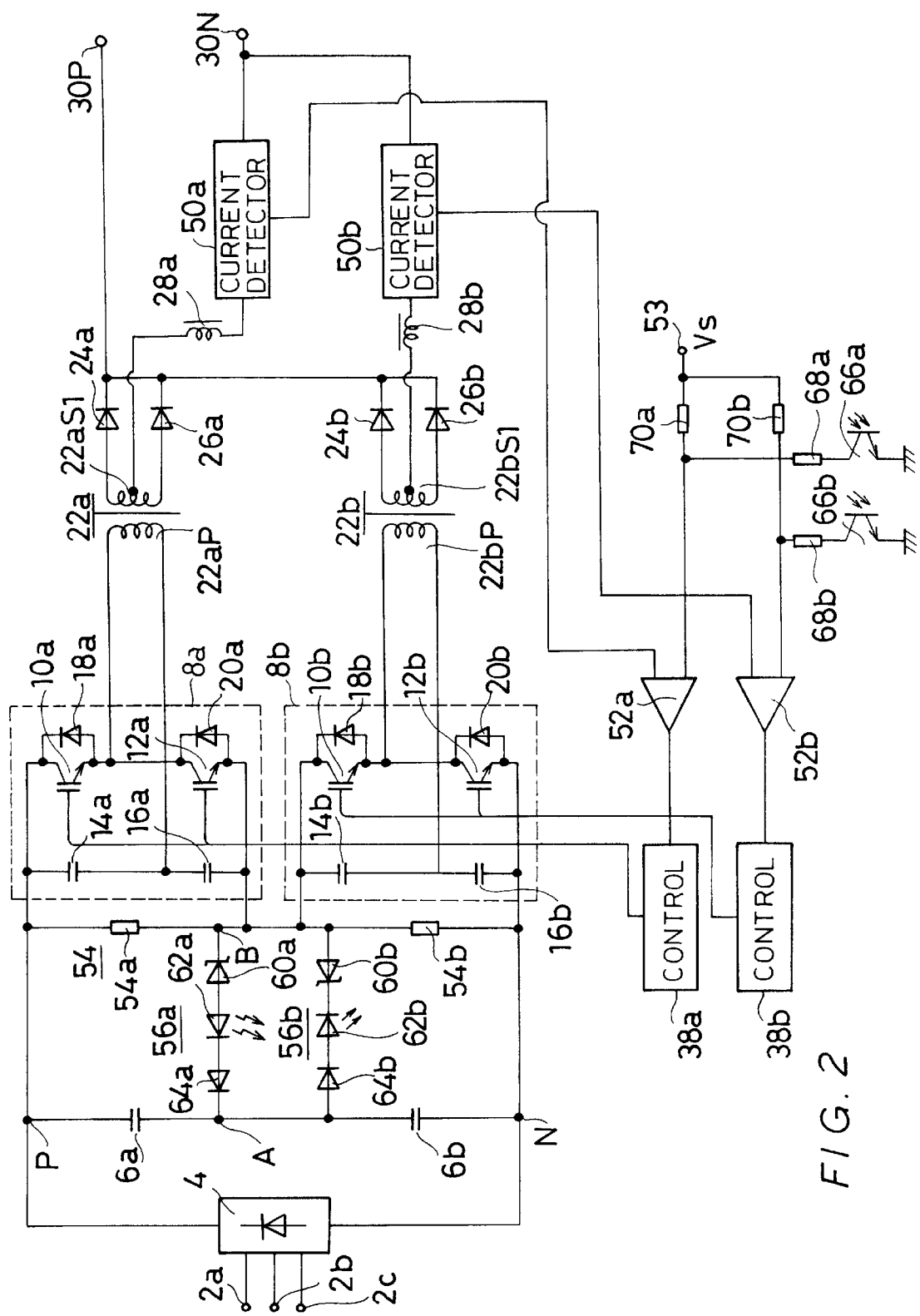
FIG. 2 is a block circuit diagram of a power supply apparatus according to a first embodiment of the present invention.

A power supply apparatus for an arc-utilizing apparatus according to a first embodiment of the present invention is shown in FIG. 2. As the prior art apparatus shown in FIG. 1, the power supply apparatus according to the first embodiment includes an input-side rectifier 4, a pair of smoothing capacitors 6a and 6b, a pair of DC-to-high-frequency converters, etc. The same reference numerals as used in FIG. 1 are attached to those components and units of the power supply apparatus shown in FIG. 2 which have structures and functions similar to those of the components and units shown in FIG. 1, and no further detailed description s are made about them.

Two ends of a secondary winding 22aS1 of a high-frequency transformer 22a are connected to the anodes of rectifying diodes 24a and 26a, respectively, and two ends of a secondary winding 22bS1 of a high-frequency transformer 22b are connected to the anodes of rectifying diodes 24b and 26b, respectively. The diodes 24a and 26a form part of one of a pair of high-frequency-to-DC converters, and the diodes 24a and 26a form part of the other high-frequency-to-DC converter. The cathodes of the diodes 24a, 26a, 24b and 26b are connected together to a positive load output terminal 30P. The secondary windings 22aS1 and 22bS1 have intermediate taps, which are connected to respective one ends of smoothing reactors 28a and 28b, respectively. The reactors 28a and 28b form part of the high-frequency-to-DC converter. The other ends of the smoothing reactors 28a and 28b are connected to a negative load output terminal 30N.

Signal detecting means, for example, an output current detector 50a is connected between the smoothing reactor 28a and the negative load output terminal 30N. Similarly, an output current detector 50b is connected between the smoothing reactor 28b and the negative load output terminal 30N. The output current detectors 50a and 50b detect signals, e.g. output current flowing between the respective high-frequency-to-DC converters and a load connected between the output terminals 30P and 30N, and develop output current representative signals representing the respective detected output currents.

The output current representative signal from the output current detector 50a is applied to an error amplifier 52a forming part of control means. The error amplifier 52a also receives a reference signal Vs from a reference signal input terminal 53, and develops an error signal representing the difference between the output current representative signal and the reference signal. The error signal is applied to an inverter control unit 38a forming part of the control means. The value of the reference signal applied at the reference signal input terminal 53 represents a value of current to be supplied to the arc-utilizing apparatus, and is variable. The inverter control unit 38a controls the conduction periods of IGBTs 10a and 12a of an inverter 8a in such a manner that the output current representative signal has a value equal to that of the reference signal. Accordingly, if the value of the reference signal is varied, the value of the output current representative signal developed by the output current detector 50a varies, tracking the variations of the reference signal value, to become equal to the reference signal value.

The output current representative signal from the output current detector 50b is applied to an error amplifier 52b forming part of control means. The error amplifier 52b also receives the reference signal from the reference signal input terminal 53, and develops an error signal representing the difference between the output current representative signal and the reference signal. The error signal is applied to an inverter control unit 38b forming part of the control means. The inverter control unit 38b controls the conduction periods of IGBTs 10b and 12b of an inverter 8b in such a manner that the output current representative signal developed by the output current detector 50b has a value equal to that of the reference signal. Accordingly, if the value of the reference signal is varied, the value of the output current representative signal developed by the output current detector 50b varies, too, tracking the variations of the reference signal value, to become equal to the reference signal value.

The inputs of the respective inverters 8a and 8b are not connected directly across the smoothing capacitors 6a and 6b, but they are connected across respective voltage-dividing resistors 54a and 54b of a voltage-divider circuit 54, which are connected in series. The resistors 54a and 54b have the same resistance value. The voltage-divider circuit 54 is connected in parallel with the series combination of the smoothing capacitors 6a and 6b.

Voltage detecting means, e.g. voltage detector circuits 56a and 56b are connected between the junction A of the capacitors 6a and 6b and the junction B of the voltage-dividing resistors 54a and 54b.

The voltage detector circuit 56a includes a switching device, e.g. a Zener diode 60a, which is rendered conductive when a voltage of a predetermined value is applied across it. The Zener diode 60a has its cathode connected to the junction B and has its anode connected to a light-emitting device, e.g. to the anode of a light-emitting diode 62a. The light-emitting diode 62a has its cathode connected to the anode of a protection diode 64a, whose cathode is connected to the junction A.

Accordingly, when the voltage at the junction B becomes higher than the voltage at the junction A and when the voltage across the Zener diode 60a becomes equal to or larger than the predetermined value, the Zener diode 60a becomes conductive. This causes the light-emitting diode 62a to emit a light signal, which is a first control signal. The generation of the control signal does not involve opening and closing of any mechanical contacts as a relay circuit, but it is based on purely non-contact type operation.

The voltage detector circuit 56b includes a Zener diode 60b. The Zener diode 60b has its anode connected to the junction B and has its cathode connected to the cathode of a light-emitting diode 62b. The light-emitting diode 62b has its anode connected to the cathode of the protection diode 64b, which has its anode connected to the junction A. The Zener diode 60b becomes conductive when the voltage at the junction A is higher than the voltage at the junction B and the voltage across the Zener diode 60b becomes equal to or larger than the predetermined value. This causes the light-emitting diode 62b to emit a light signal, which is a second control signal.

The Zener diodes 60a and 60b have the same characteristics, and, accordingly, the voltages across them when they are rendered conductive are equal. Also, the light-emitting diodes 62a and 62b have the same characteristics, and the protection diodes 64a and 64b are of the same characteristics. The protection diodes 64a and 64b may be eliminated.

The light-emitting diode 62a forms a photocoupler with a light-receiving device, e.g. a light-receiving transistor 66a, and the light-emitting diode 62b forms a photocoupler with a light-receiving transistor 66b. The light-receiving transistors 66a and 66b form part of correction means. The emitter of the light-receiving transistor 66a is grounded, and the collector is connected through a resistor 68a to an input of the error amplifier 52a, which receives the output current representative signal from the output current detector 50a at the other input, as described previously. This input of the error amplifier 52a is coupled through a resistor 70a to the reference signal input terminal 53. The resistors 68a and 70a and the light-receiving transistor 66a form a variable attenuator having an attenuation factor variable in, for example, two steps.

When the light-receiving transistor 66a is not receiving the first control signal in the form of a light signal, it is nonconductive, whereby the reference signal as applied to the reference signal input terminal 53 is applied to the error amplifier 52a. On the other hand, when the light-receiving transistor 66a receives the first control signal and, therefore, becomes conductive, the resistor 68a is grounded. Then, the reference signal as voltage-divided by the resistors 70a and 68a is applied to the error amplifier 52a.

Similarly, the light-receiving transistor 66b has its emitter grounded and has its collector coupled through a resistor 68b to one input of the error amplifier 52b, which receives at the other input the output current representative signal from the output current detector 50b. The said one input terminal of the error amplifier 52b is also connected through a resistor 70b to the reference signal input terminal 53. The resistors 68b and 70b and the light-receiving transistor 66b form a variable attenuator.

The resistors 68a, 68b, 70a and 70b form the rest of the correction means.

In operation, when, for example, the voltages across the smoothing capacitors 6a and 6b are substantially equal and the voltages across the Zener diodes 60a and 60b are less than the predetermined voltage which can render them conductive, both light-receiving transistors 66a and 66b are nonconductive, and, therefore, the reference signal as applied to the reference signal input terminal 53 is coupled to the error amplifiers 52a and 52b. Then, the conduction periods of the IGBTs 10a and 12a of the inverter 8a and the conduction periods of the IGBTs 10b and 12b of the inverter 8b are controlled in such a manner that the output current representative signals can have a value equal to the value of the reference signal.

If the voltage across the smoothing capacitor 6a is larger than the voltage across the smoothing capacitor 6b, the voltages across the voltage-dividing resistors 54a and 54b, which have the same resistance value, are equal to one half the voltage across the series combination of the smoothing capacitors 6a and 6b. Accordingly, when the voltage at the junction B becomes higher than the voltage at the junction A and the voltage across the Zener diode 60a rises above the predetermined value, the light-emitting diode 62a emits light to thereby render the light-receiving transistor 66a conductive. Then, the reference signal applied to the error amplifier 52a is a voltage-divided version of the signal as applied to the reference signal input terminal 53, voltage-divided by the resistors 70a and 68a. The error amplifier 52a receives the reference signal decreased by a predetermined value. This results in reduction of the current flowing in the inverter 8a, which, in turn, decreases the output current representative signal from the output current detector 50a until it is equal to the decreased reference signal applied to the error amplifier 52a. As a result, the input impedance of the inverter 8a increases.

On the other hand, the light-emitting diode 62b does not emit light, the error amplifier 52b receives the reference signal Vs as it is applied to the reference signal input terminal 53, and the conduction periods of the IGBTs 10b and 12b of the inverter 8b are controlled in such a manner as to make the output current representative signal from the output current detector 50b equal to the reference signal Vs.

As a result, the current flowing in the inverter 8a decreases below the current flowing in the inverter 8b, so that the input voltage to the inverter 8a increases until it becomes substantially equal to the voltage across the capacitor 6a, while the input voltage to the inverter 8b decreases until it becomes substantially equal to the voltage across the capacitor 6b.

If the voltage across the smoothing capacitor 6a is lower than the voltage across the smoothing capacitor 6b, the voltages across the respective voltage-dividing resistors 54a and 54b are equal to one half the voltage across the series combination of the capacitors 6a and 6b. Therefore the junction B is at a lower potential than the junction A. When the voltage across the Zener diode 60b exceeds the predetermined value, the light-emitting diodes 56b emits light, which is received by the light-receiving transistors 66b to render it conductive. Then, the reference signal Vs at the reference signal input terminal 53 is voltage-divided by the resistors 70b and 68b before it is applied to the error amplifier 52b. Thus, the reference signal decreased by a predetermined value is applied to the error amplifier 52b. This causes decrease of the current flowing in the inverter 8b, resulting in decrease of the output current representative signal from the output current detector 50b to a value equal to the value of the decreased reference signal applied to the input of the error amplifier 52b. Thus, the input impedance of the inverter 8b increases.

On the other hand, since the light-emitting diode 62a does not emit light, the reference signal as applied at the reference signal input terminal 53 is coupled to the error amplifier 52b, and the IGBTs 10a and 12a of the inverter 8a are controlled so as to make the output current representative signal equal to the reference signal Vs.

This causes the current flowing in the inverter 8b to be smaller than the current flowing in the inverter 8a, which results in increase of the input voltage to the inverter 8b until it becomes substantially equal to the voltage across the capacitor 6b and in decrease of the input voltage to the inverter 8a until it becomes substantially equal to the voltage across the capacitor 6a.

Figure 3:
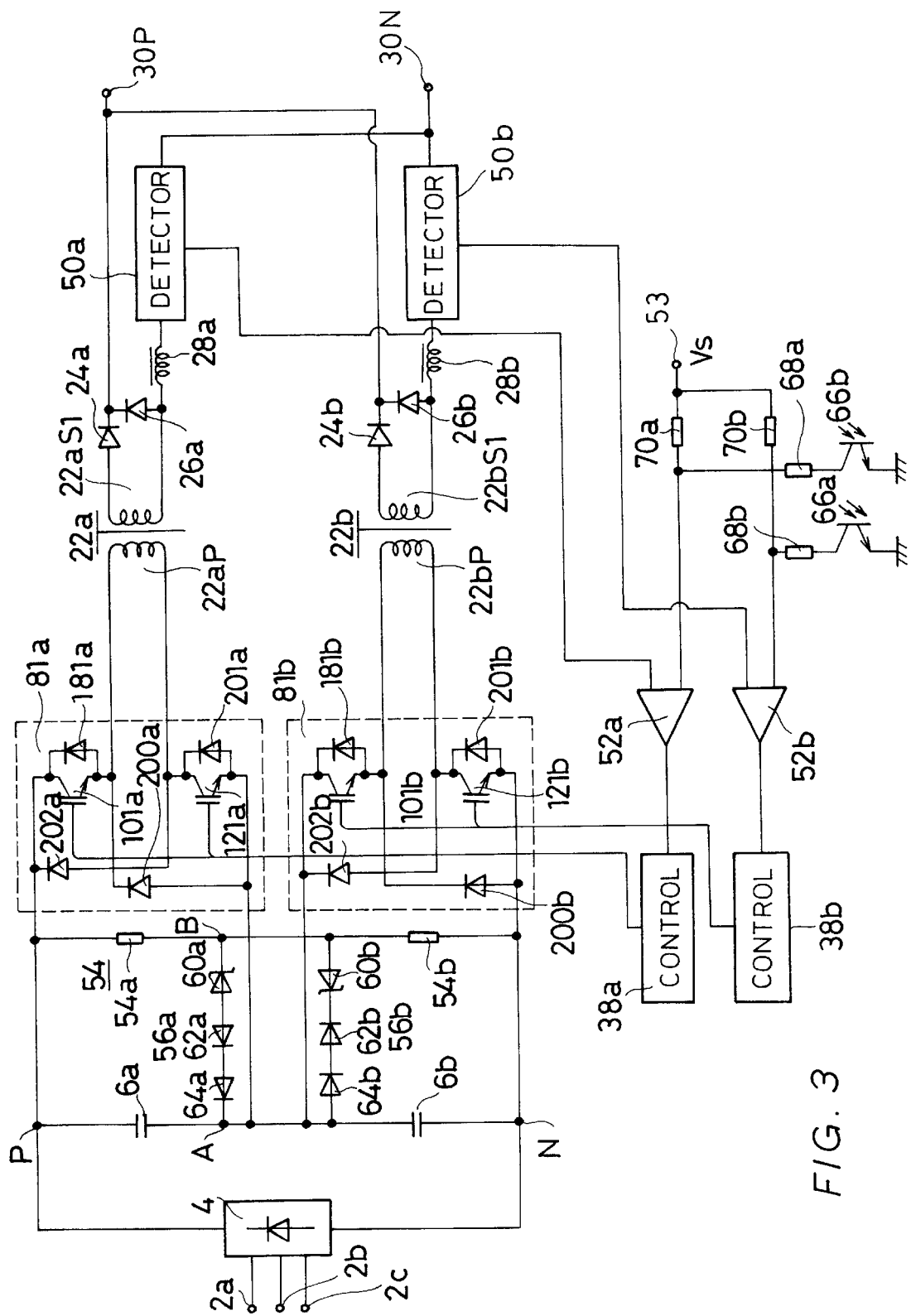
FIG. 3 is a block circuit diagram of a power supply apparatus according to a second embodiment of the present invention.

FIG. 3 is a block circuit diagram of a power supply apparatus according to a second embodiment of the present invention. The same reference numerals as used in FIG. 2 denote the same components and functions as in the circuit shown in FIG. 2.

Different from the power supply apparatus shown in FIG. 2 which includes the DC-to-high-frequency converters formed of the inverters 8a and 8b and the transformers 22a and 22b, the power supply apparatus shown in FIG. 3 employs two-transistor forward converters 81a and 81b.

The converter 81a includes IGBTs 101a and 121a as semiconductor switching devices. The IGBT 101a has its emitter connected to the cathode of a diode 200a having its anode connected to the emitter of the IGBT 121a. The collector of the IGBT 101a is connected to the cathode of a diode 202a of which the anode is connected to the collector of the IGBT 121a.

The junction of the emitter of the IGBT 101a and the cathode of the diode 200a, which provides one output terminal of the converter 81a, is connected to one end of the primary winding 22aP of the transformer 22a. The junction of the collector of the IGBT 121a and the anode of the diode 202a, which provides another output terminal of the converter 81a, is connected to the other end of the primary winding 22aP of the transformer 22a.

Inputs of the converter 81a are provided at the cathode of the diode 202a and the anode of the diode 200a. The two inputs are connected to the opposite ends of the smoothing capacitor 6a, instead of the voltage-dividing resistor 54a. Flywheel diodes 181a and 201a are connected across the collector-emitter conduction paths of the IGBTs 101a and 121a, respectively.

The rectifying diodes 24a and 24b have their respective anodes connected to one ends of the secondary windings 22aS1 and 22bS1 of the high-frequency transformers 22a and 22b, respectively. The cathodes of the diodes 24a and 24b are connected together to the positive load output terminal 30P of the circuit. The other ends of the respective secondary windings 22aS1 and 22bS1 are connected to one ends of the respective smoothing reactors 28a and 28b, of which the other ends are connected through respective ones of detecting means, e.g. the output current detectors 50a and 50b, to the negative load output terminal 30N of the circuit. The flywheel diodes 26a and 26b have their anodes connected to the respective ones of the other ends of the secondary windings 22aS1 and 22bS1, and has their cathodes connected to the cathodes of the rectifying diodes 24a and 24b, respectively.

When the control unit 38a supplies a control signal to the IGBTs 101a and 121a to render them conductive, current from the capacitor 6a flows through the collector-emitter conduction path of the IGBT 101a, the primary winding 22aP of the transformer 22a and the collector-emitter conduction path of the IGBT 121a. When the IGBTs 101a and 121a are rendered nonconductive in response to the control signal from the control unit 38a, energy stored in the primary winding 22aP flows through the diode 202a, the smoothing capacitor 6a and the diode 200a. As the IGBTs 101a and 121a are rendered conductive and nonconductive, a voltage is induced in the secondary winding 22aS1, which is, then rectified and smoothed before it is applied to an arc-utilizing apparatus connected between the output terminals 30P and 30N.

IGBTs 101b and 121b, diodes 200b and 202b, and flywheel diodes 181b and 201b are connected in the same way as the IGBTs 101a and 121a, the diodes 200a and 202a, and the flywheel diodes 181a and 201a, so as to form the converter 81b. The converter 81b operates in a manner similar to the converter 81a.

Different from the circuit of FIG. 2, the collector of the light-receiving transistor 66a is connected to the resistor 68b, instead of the resistor 68a, and the collector of the light-receiving transistor 66b is connected to the resistor 68a, instead of the resistor 68b.

Therefore, when the voltage across the smoothing capacitor 6a is larger than the voltage across the smoothing capacitor 6b and a light signal from the light-emitting diode 62a is coupled to the light-receiving transistor 66a, the reference signal applied to the error amplifier 52b decreases, while the magnitude of the reference signal applied to the error amplifier 52a remains the same. Then, the current flowing in the converter 81b becomes smaller, while the current flowing in the converter 81a remains the same. In other words, the current flowing in the converter 81a is larger than the current flowing in the converter 81b, and, therefore, the discharging of the capacitor 6a is accelerated, while the amount of discharge from the capacitor 6b decreases. As a result, the input voltage to the converter 81a decreases, whereas the input voltage to the converter 81b increases, until they become substantially equal to each other.

Similar operation takes place when the voltage across the smoothing capacitor 6a is smaller than the voltage across the smoothing capacitor 6b.

The circuit shown in FIG. 2 may be modified by, for example, connecting the input terminals of the inverter 8a to respective ones of the opposite ends of the smoothing capacitor 6a, connecting the input terminals of the inverter 8b to respective ones of the opposite ends of the smoothing capacitor 6b, connecting the collector of the light-receiving transistor 66a to the resistor 68b and connecting the collector of the light-receiving transistor 66b to the resistor 68a, as in the circuit of FIG. 3.

The circuit of FIG. 3 may be modified by connecting the inputs of the converter 81a to respective ones of the opposite ends of the voltage-dividing resistor 54a, connecting the inputs of the converter 81b to respective ones of the opposite ends of the voltage-dividing resistor 54b, connecting the collector of the light-receiving transistor 66a to the resistor 68a and connecting the collector of the light-receiving transistor 66b to the resistor 68b.

In the power supply apparatuses shown in FIGS. 2 and 3, the reference signal is varied. Instead, it may be arranged to couple the output current representative signals from the output current detectors 50a and 50b respectively to the error amplifiers 52a and 52b through associated amplifiers of which the amplification factors are variable in response to a light signal emitted by the light-emitting diode 62a or 62b.

Figure 4:
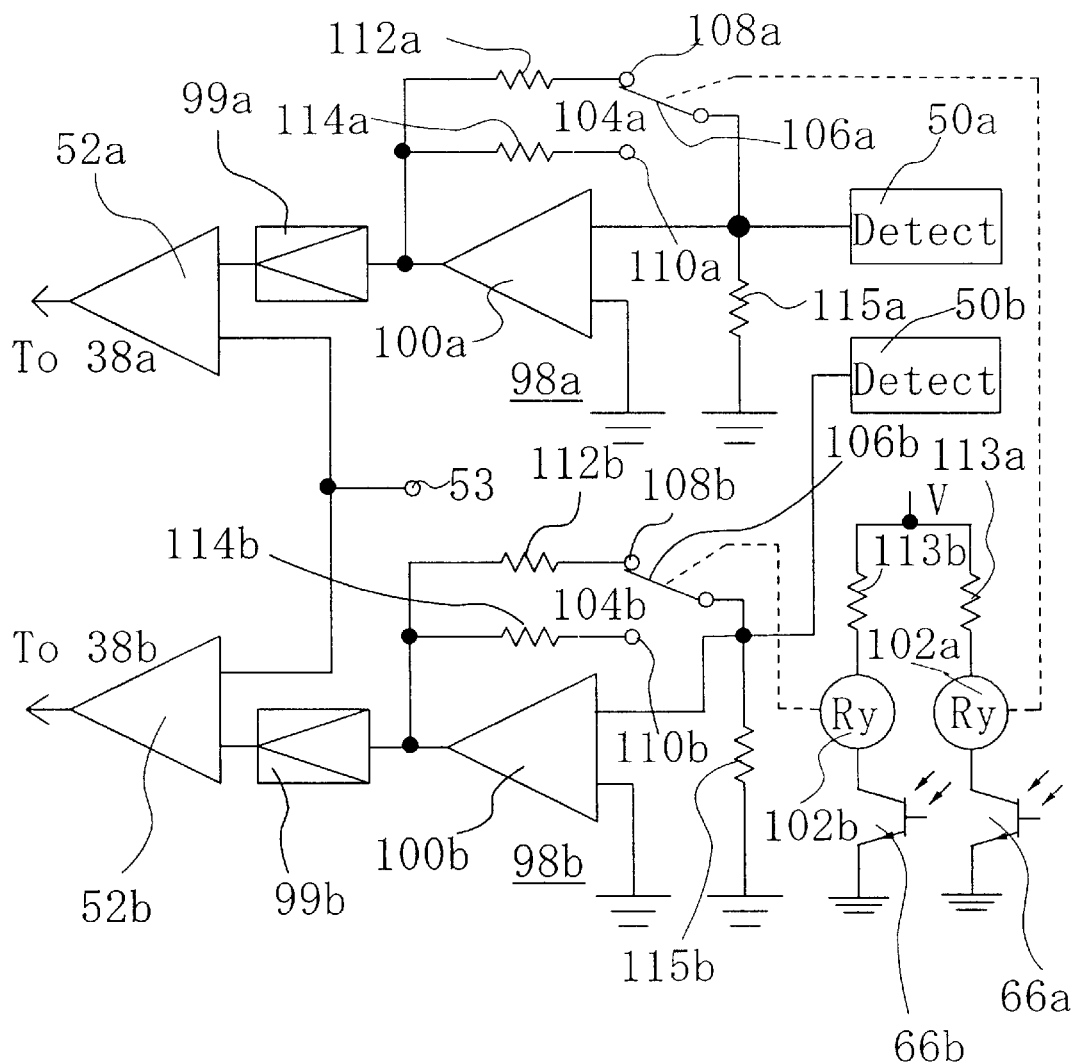
FIG. 4 is a circuit diagram of part of a modification of the power supply apparatus shown in FIG. 2 or 3.

Such modification is exemplified in FIG. 4. FIG. 4 is a circuit diagram of part of the modification which can be made to the power supply apparatuses shown in FIGS. 2 and 3. In FIG. 4, the output current representative signals from the output current detectors 50a and 50b are amplified in variable gain, inverting amplifiers 98a and 98b, respectively. The amplifier 98a includes an operational amplifier 100a, a switch 104a, feedback resistors 112a and 114a, and a fixed-resistance resistor 115a. The operational amplifier 100a has its inverting input to which the output of the output current detector 50a is applied, has its non-inverting input grounded, and has its output connected through a fixed gain, inverting amplifier 99a to the error amplifier 52a. The switch 104a has a movable arm 106a which can be connected to either one of two contacts 108a and 110a thereof. The feedback resistor 112a is connected between the output of the operational amplifier 100a and the contact 108a of the switch 104a, and the feedback resistor 114a is connected between the output of the operational amplifier 100a and the other contact 110a of the switch 104a. The resistor 115a has its one end grounded and has its other end connected to the inverting input of the operational amplifier 100a and to the movable arm 106a of the switch 104a. The movable arm 106a is driven by a relay drive coil 102a, which is connected between one end of a resistor 113a and the collector of the light-receiving transistor 66a having its emitter grounded. The other end of the resistor 113a is connected to a DC supply V. Thus, the switch 104a and the relay drive coil 102a form a relay.

Similarly, the amplifier 98b includes an operational amplifier 100b, a switch 104b having contacts 108b and 110b and a movable arm 106b, feedback resistors 112b and 114b, and a fixed resistor 115b. These components are connected in the same manner as the corresponding components of the amplifier 98a. A fixed gain, inverting amplifier 99b is connected between the error amplifier 52b and the operational amplifier 100b. Also, a relay drive coil 102b and a resistor 113b are connected between the DC supply V and the light-receiving transistor 66b, in the same way as the relay drive coil 102a and the resistor 113a.

Outputs from the amplifiers 98a and 98b are amplified in the fixed gain, inverting amplifiers 99a and 99b, respectively, and, then, applied to the respective error amplifiers 52a and 52b. The error amplifiers 52a and 52b also receive a reference signal having a fixed value supplied from the reference signal input terminal 53.

When the light-receiving transistor 66a receives no light signal, no current flows through the relay drive coil 102a, which causes the movable relay arm 106a of the switch 104a to be thrown to the contact 108a. As a result, the feedback resistor 112a is connected between the inverting input and output terminals of the operational amplifier 100a.

When the light-receiving transistor 66a receives a light signal, current flows in the relay drive coil 102a from the DC supply V through the resistor 113a, which causes the movable arm 106a of the switch 104a to be thrown to the contact 110a. As a result, the feedback resistor 114a is connected between the inverting input and output of the operational amplifier 100a. The resistance value of the resistor 114a is larger than that of the resistor 112a.

Thus, when the light-receiving transistor 66a receives light, the gain of the variable gain, inverting amplifier 98a increases.

Similarly, when the light-receiving transistor 66b receives light, the gain of the variable gain, inverting amplifier 98b increases.

In the above-described embodiments, the output current detectors 50a and 50b are coupled at the outputs of the respective high-frequency-to-DC converters, but the inverters 8a and 8b or the converters 81a and 81b may be controlled in accordance with currents flowing through them.

Further, instead of detecting the output currents, the output voltages may be detected.

Also, in place of the photocouplers, solid state relays may be used.

The attenuation factor of the attenuator formed of the resistors 68a and 70a and the attenuation factor of the attenuator formed of the resistors 68b and 70b are variable in two steps because the voltage detector circuits 62a and 62b use the Zener diodes 60a and 60b, respectively. However, it may be so arranged as to vary the attenuation factors of the attenuators in a stepless or continuous fashion in accordance with the voltage between the junctions A and B detected by a voltage detector. The number of steps in which the attenuation factors are changed may be larger than two.

What is claimed is:

1. A power supply apparatus for an arc-utilizing apparatus, comprising:

an input-side rectifier for rectifying an AC signal and developing a rectified signal between positive and negative output terminals thereof;

a pair of smoothing capacitors connected in series between said positive and negative output terminals of said input-side rectifier;

a pair of DC-to-high-frequency converters each including a semiconductor switching device, for converting DC signals supplied from associated ones of said smoothing capacitors into high-frequency signals;

a pair of high-frequency-to-DC converters for converting high-frequency signals supplied from associated ones of said DC-to-high-frequency converters into DC signals for application to said arc-utilizing apparatus;

signal detecting means for detecting the DC signals supplied from said high-frequency-to-DC converters to said arc-utilizing apparatus and developing DC signal representative signals representing the values of the DC signals;

a pair of control means associated with respective ones of said pair of DC-to-high-frequency converters for controlling conduction periods of said semiconductor switching devices of the associated DC-to-high-frequency converters in such a manner that the DC signal representative signals applied thereto become equal to reference signals applied thereto;

a voltage divider circuit comprising a pair of voltage-dividing resistors connected in series, said voltage divider circuit being connected in parallel with the series combination of said smoothing capacitors;

voltage detecting means coupled between the junction of said smoothing capacitors and the junction of said voltage-dividing resistors, for detecting a voltage between said junctions and developing a detected voltage representative signal representing the detected voltage; and correction means receiving either said reference signal or said DC signal representative signal and being responsive to the application of said detected voltage representative signal, for correcting the value of said reference signal or DC signal representative signal applied to one of said control means so as to become different from the value of said reference signal or DC signal representative signal applied to the other of said control means.

2. The power supply apparatus according to claim 1 wherein inputs of each of said DC-to-high-frequency converters are connected to opposite ends of an associated one of said voltage-dividing resistors; and said correction means corrects the value of said reference signal or DC signal representative signal in such a manner as to decrease output current from that one of said DC-to-high-frequency converters which is connected through the associated voltage-dividing resistor to that one of said smoothing capacitors across which a larger voltage is developed than the other.

3. The power supply apparatus according to claim 2 wherein:

said voltage detecting means is of a non-contact type, and develops a first control signal when the voltage at the junction of said voltage-dividing resistors is higher than the voltage at the junction of said smoothing capacitors and a second control signal when the voltage at the junction of said voltage-dividing resistors is lower than the voltage at the junction of said smoothing capacitors; and said correction means decreases said reference signal or alternatively increases said DC signal representative signal applied to the control means for the DC-to-high-frequency converter connected to the smoothing capacitor connected to said positive output terminal of said input-side rectifier when said first control signal is developed, and decreases said reference signal or alternatively increases said DC signal representative signal applied to the control means for the DC-to-high-frequency converter connected to the smoothing capacitor connected to said negative output terminal of said input-side rectifier when said second control signal is developed.

4. The power supply apparatus according to claim 1 wherein inputs of each of said DC-to-high-frequency converters are connected to opposite ends of an associated one of said smoothing capacitors; and said correction means corrects the value of said reference signal or DC signal representative signal in such a manner that the DC signal applied to that one of said DC-to-high-frequency converters which is connected to that one of said smoothing capacitors across which a larger voltage is developed than the other becomes larger than the DC signal applied to said other DC-to-high-frequency converter.

5. The power supply apparatus according to claim 4 wherein:

said voltage detecting means is of a non-contact type, and develops a first control signal when the voltage at the junction of said voltage-dividing resistors is higher than the voltage at the junction of said smoothing capacitors and a second control signal when the voltage at the junction of said voltage-dividing resistors is lower than the voltage at the junction of said smoothing capacitors; and said correction means decreases said reference signal or alternatively increases said DC signal representative signal applied to the control means for the DC-to-high-frequency converter connected to the smoothing capacitor connected to said negative output terminal of said input-side rectifier when said first control signal is developed, and decreases said reference signal or alternatively increases said DC signal representative signal applied to the control means for the DC-to-high-frequency converter connected to the smoothing capacitor connected to said positive output terminal of said input-side rectifier when said second control signal is developed.

6. The power supply apparatus according to claim 1 wherein said signal detecting means detects signals conducted by said respective DC-to-high-frequency converters.

7. The power supply apparatus according to claim 2 wherein said signal detecting means detects signals conducted by said respective DC-to-high-frequency converters.

8. The power supply apparatus according to claim 3 wherein said signal detecting means detects signals conducted by said respective DC-to-high-frequency converters.

9. The power supply apparatus according to claim 4 wherein said signal detecting means detects signals conducted by said respective DC-to-high-frequency converters.

10. The power supply apparatus according to claim 5 wherein said signal detecting means detects signals conducted by said respective DC-to-high-frequency converters.

* * * * *